United States Patent
Gerber

(10) Patent No.: US 10,183,740 B2
(45) Date of Patent: Jan. 22, 2019

(54) LEADING EDGE NOSE STRUCTURE ON THE VERTICAL STABILIZER OF AN AIRCRAFT

(71) Applicant: Airbus Operations GmbH, Hamburg (DE)

(72) Inventor: Martin Gerber, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 14/729,632

(22) Filed: Jun. 3, 2015

(65) Prior Publication Data
US 2015/0360766 A1  Dec. 17, 2015

(30) Foreign Application Priority Data
Jun. 13, 2014  (EP) .................................... 14172381

(51) Int. Cl.
*B64C 21/06* (2006.01)
*B64C 5/06* (2006.01)

(52) U.S. Cl.
CPC ................ *B64C 21/06* (2013.01); *B64C 5/06* (2013.01); *B64C 2230/04* (2013.01); *B64C 2230/20* (2013.01); *B64C 2230/22* (2013.01); *Y02T 50/166* (2013.01)

(58) Field of Classification Search
CPC .......... B64C 5/06; B64C 7/00; B64C 21/025; B64C 21/06; B64C 21/08; B64C 2230/20; B64C 2230/22; B64D 15/00; B64D 15/02; B64D 2045/009; B64D 2045/0095
See application file for complete search history.

(56) References Cited

U.S. PATENT DOCUMENTS

| 4,275,859 A * | 6/1981 | Bleday ...................... B64C 1/38 244/121 |
| 4,477,040 A * | 10/1984 | Karanik ................... B64C 21/04 244/58 |
| 5,366,177 A | 11/1994 | DeCoux |
| 5,899,416 A | 5/1999 | Meister et al. |
| 6,050,523 A * | 4/2000 | Kraenzien ................. B64C 9/00 244/123.1 |

(Continued)

FOREIGN PATENT DOCUMENTS

| CN | 102548841 A | 7/2012 |
| DE | 19649132 | 5/1998 |

(Continued)

OTHER PUBLICATIONS

European Search Report, dated Nov. 21, 2014.

(Continued)

*Primary Examiner* — Joseph W Sanderson
(74) *Attorney, Agent, or Firm* — Greer, Burns & Crain, Ltd.

(57) ABSTRACT

An aircraft with a fuselage, wings, horizontal stabilizers and a vertical stabilizer, wherein on a front portion of the vertical stabilizer an elongated one-piece nose element is mounted which forms lateral air guide surfaces. To the front end of the nose element a perforated metal plate nose member is attached. The front end of the nose element being closed and between this closed front end and the nose member an elongated air channel is formed.

8 Claims, 4 Drawing Sheets

(56) References Cited

U.S. PATENT DOCUMENTS

| | | | | |
|---|---|---|---|---|
| 7,866,609 B2* | 1/2011 | Parikh | .................... | B64C 21/06 244/209 |
| 8,800,915 B2* | 8/2014 | Gerber | .................... | B64C 5/06 244/123.1 |
| 9,511,848 B2* | 12/2016 | Gerber | .................... | B64C 3/26 |
| 9,623,959 B2* | 4/2017 | Schrauf | .................. | B64C 21/06 |
| 2009/0212165 A1* | 8/2009 | Parikh | .................... | B64C 21/06 244/209 |
| 2012/0187252 A1* | 7/2012 | Gerber | .................... | B64C 5/06 244/209 |
| 2013/0001356 A1* | 1/2013 | Llamas Sand N | ........ | B64C 1/26 244/54 |
| 2013/0175402 A1* | 7/2013 | Voege | .................... | B64C 3/26 244/209 |
| 2013/0270390 A1* | 10/2013 | Schrauf | .................. | B64C 21/06 244/91 |
| 2014/0021304 A1* | 1/2014 | Gerber | .................... | B64C 3/26 244/35 R |

FOREIGN PATENT DOCUMENTS

| | | | |
|---|---|---|---|
| DE | 102009043489 | 3/2011 | |
| DE | 102010014640 | 10/2011 | |
| DE | 102010014641 | 10/2011 | |
| EP | 0836989 | 4/1998 | |
| WO | WO-2012028467 A1 * | 3/2012 | ............... B64C 3/26 |

OTHER PUBLICATIONS

Chinese Office Action and English Translation for CN Patent Application No. 201510329956.0 dated Sep. 26, 2016 (8 pages).
Chinese Office Action for CN Patent Application No. 201510329956.0 dated Dec. 6, 2017 (7 pages).

* cited by examiner

LEADING EDGE NOSE STRUCTURE ON THE VERTICAL STABILIZER OF AN AIRCRAFT

CROSS-REFERENCES TO RELATED APPLICATIONS

This application claims the benefit of the European patent application No. 14172381.7 filed on Jun. 13, 2014, the entire disclosures of which are incorporated herein by way of reference.

BACKGROUND OF THE INVENTION

The present invention relates to an aircraft with a fuselage, wings, horizontal stabilizers and a vertical stabilizer, wherein on the front portion of the vertical stabilizer an elongated one-piece nose element is mounted which forms lateral air guide surfaces, and wherein to the front end of which nose element a perforated metal plate nose member is attached.

In a prior art vertical stabilizer of this type (EP 0 836 989 A2), the one-piece nose element is open at its front end which front end is covered by a metal plate nose member. In addition to the perforation in the nose member, perforations are provided in the nose element. In operation, air from the outside is sucked into a chamber enclosed by the lateral walls of the nose element and the nose member. From this chamber the air can be removed by a suction pump or the like. By such removal of air, a laminar air flow is formed on the external surface of the vertical stabilizer.

Due to the perforations in both the nose element and the nose member, air is removed along a relatively long area so that laminar air flows are obtained over a relatively large distance.

In another prior art design (US 2009/0212165 A1) a perforated one-piece nose element is mounted to an auxiliary strut of the internal structure of the vertical stabilizer, which nose element is curved at its front end so that air can enter at such front end and at the side walls. Such a nose piece requires relatively strong material and/or an inner reinforcement member with openings for the air flow to obtain the necessary strength.

SUMMARY OF THE INVENTION

It is an object of the invention to provide for a structure which permits simple manufacturing and still permits forming of laminar air flows in operation.

This object is obtained by providing a vertical stabilizer structure in which the front end of the nose element is closed and a perforated metal plate nose member is attached thereto and wherein between this closed front end and the nose member an elongated air channel is formed.

In such a structure, the interior of the nose element is no longer formed as a chamber or duct from which air is to be removed, but all air removed from the outside to form laminar air flows enters the air channel formed by the front end of the nose element and the nose member attached thereto. Thereby a nose element structure becomes possible that is easy to manufacture, e.g., by molding it of a sandwich material comprising an inner layer of a glass fiber reinforced polymer (GFRP). With such a design of the nose element only the perforated metal plate nose member is required to form the elongate air channel together with the nose element.

Admittedly, the reduction of the porous surface which permits removal of air from the outer surface of the vertical stabilizer is smaller than in the prior art structures discussed above so that forming of laminar air flows is reduced. However, this disadvantage over the prior art is very well compensated by the simplified structure and the easier manufacturing resulting from the design according to the invention.

To effect passive air removal the air channel may extend to the upper end of the vertical stabilizer and is then open at its upper end. Thus in operation the air flowing across such open upper end will generate a reduced pressure in the air channel which results in removal of air from the air channel.

Preferably, the cross-section of the air channel decreases from the lower end to the upper end to improve air removal.

In another embodiment it is possible to provide for active air removal from the air channel by connecting the air channel to a suction pump or the like.

To obtain a stable structure of the nose member, at its front end an elongated enforcement element may be attached to the inner surface of the nose member which enforcement element comprises a plurality of openings. These openings permit distribution of air in the entire air channel formed by the front end of the nose element and the nose member.

Such enforcement element is generally arranged symmetrically with respect to a vertical plane through the longitudinal axis of the fuselage and is formed in cross-section so that at least one vertical channel between the enforcement element and the inner surface of the nose member is formed.

To obtain a connection between the nose member and the nose element the attachment area for fixing the nose member to the nose element can be fixed to the nose element by an adhesive bonding.

The metal plate nose member preferably comprises titanium, a titanium alloy or stainless steel.

In particular when the nose member is molded of a sandwich material comprising a fiber reinforced plastics material, e.g., GFRP the front end of the nose element may be curved. Such a design facilitates insertion of the sandwich material into the correspondingly formed mold.

BRIEF DESCRIPTION OF THE DRAWINGS

In the following the invention will be described with reference to the drawings showing preferred embodiments.

DETAILED DESCRIPTION OF THE PREFERRED EMBODIMENTS

Figure 1:
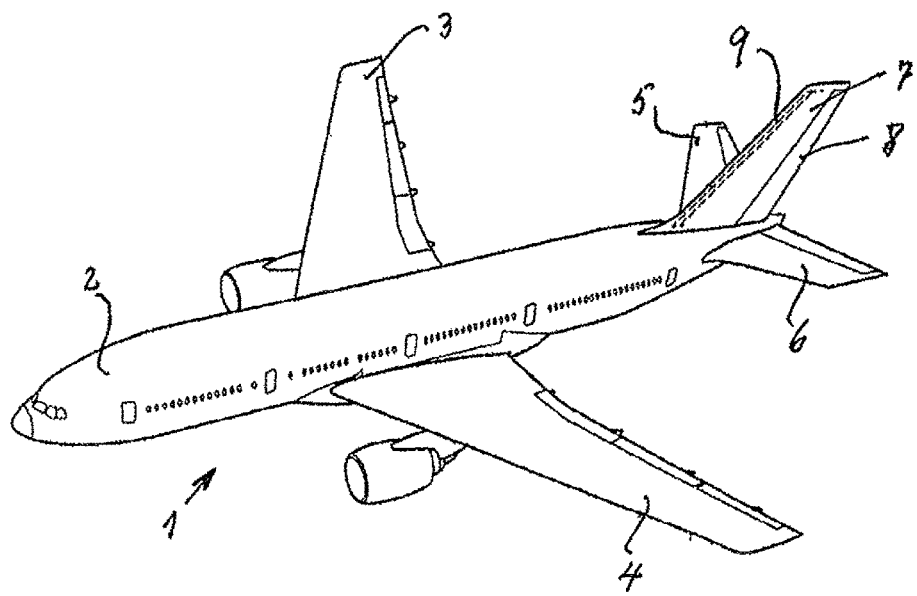
FIG. 1 is a schematic illustration of an aircraft in which a design according to the invention is provided.

The aircraft 1 shown in FIG. 1 comprises a fuselage 2, wings 3 and 4, horizontal stabilizers 5 and 6 and a vertical stabilizer 7 to the rear end of which the rudder 8 is connected. At the front end of the vertical stabilizer 7, an air suction region 9 designed according to the invention is provided.

As shown in more detail in FIG. 2, at the front end of the vertical stabilizer 7 an elongated one-piece nose element is mounted which together with a perforate metal plate nose member forms an elongated air channel 9 which structure will be described in detail in the following with respect to FIGS. 3 to 5. As also indicated in FIG. 2, the schematically shown HF-antenna 15 is located within the one-piece nose element.

Figure 3:
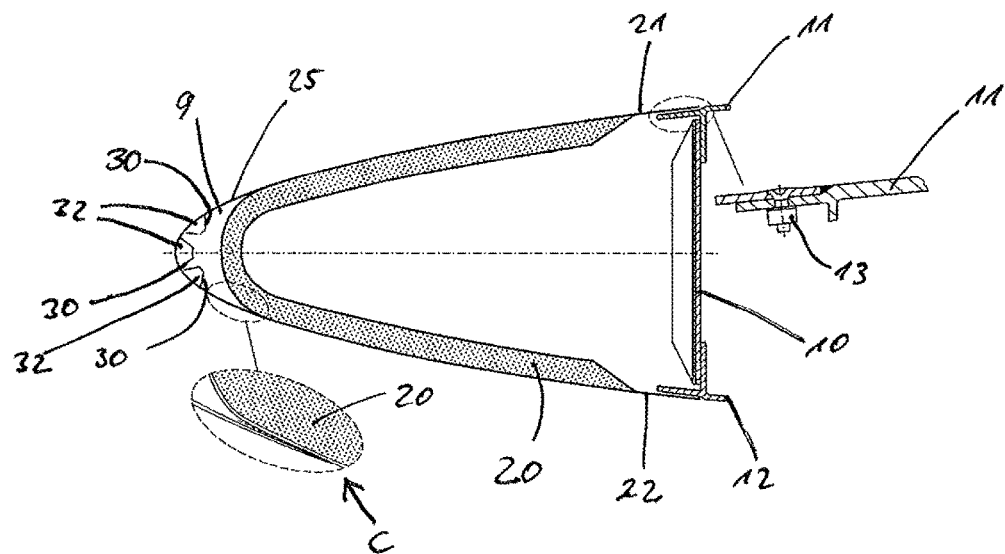
FIG. 3 shows a partially schematic cross-sectional illustration of a portion of the vertical stabilizer along lines A-A in FIG. 2.

As shown in FIG. 3, the free rear ends 21, 22 of the outer layer of the nose element 20 are mounted by means of screws 13 to T-shaped elements 11, 12 secured to a front spar 10 of the vertical stabilizer 7, as well known. The nose element 20 is closed at its front end which forms a curved front portion. The nose element 20 may comprise a GFRP sandwich forming a glass fiber enforced foam core with outer layers of glass fiber meshes impregnated with the polymer that forms the core. To the front end of the nose element 20, an elongated curved perforated metal plate nose member 25 is attached by means of an adhesive, as indicated in the blown-up partial sketch C in FIG. 3. To obtain smooth flow surfaces on the outside of the nose structure, the ends 26 of the nose member 25 are reduced in thickness by rolling, as indicated in FIG. 4 at D. The nose member 25 preferably comprises titanium or stainless steel plate material and the perforations or holes 40 can be generated by laser drilling wherein e.g., 4 million holes per m2 may be provided and the holes may be circularly or triangularly shaped. The front end of the nose element 20 and the nose member 25 form the elongated air channel 9.

In the front end of the nose member 25 elongated enforcement elements 30 are attached to its inner surface. In this particular embodiment, three enforcement elements 30 are employed and one enforcement element 30 is centered with respect to the tip end of nose member 25, whereas the other enforcement elements 30 are located laterally with respect to the centered element. These enforcement elements may comprise the same material as the nose member 25 and may have outwardly bent ends for surface engagement with the nose member 25. Attachment thereto may be effected by brazing. As indicated, the enforcement elements 30 are arranged symmetrically with respect to a vertical plane through the longitudinal axis of the fuselage which plane is shown in FIG. 3 in dotted line. The enforcement elements 30 have a cross-section so that one or more vertical channels 32 are formed between the enforcement elements and the inner surface of the nose member 25. Thus, in this embodiment three channels 32 are formed.

Figure 2:
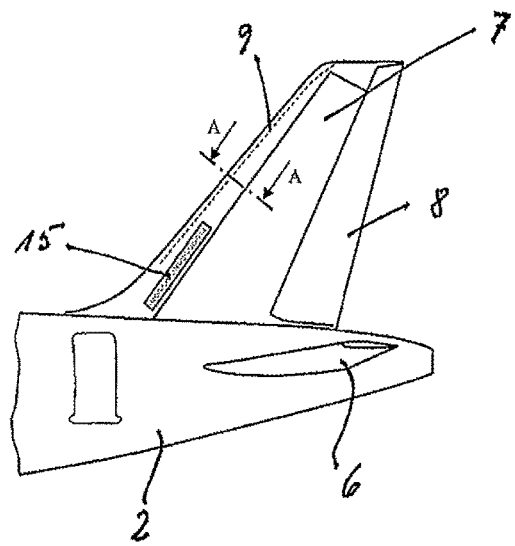
FIG. 2 shows a view of the vertical stabilizer incorporating an embodiment of the invention.

As indicated in FIG. 2, the air channel 9 is open at its upper end so that in operation air is sucked out of the air channel due to the air flowing across the upper end of the vertical stabilizer 7.

Figure 5:
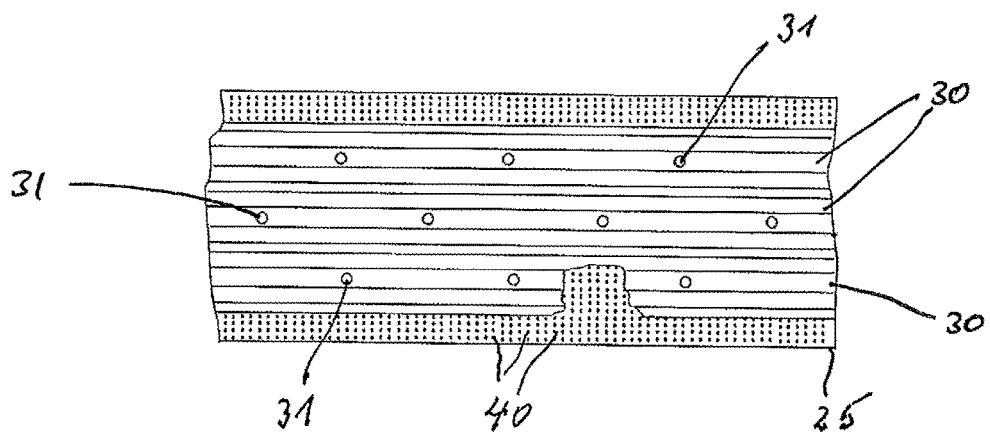
FIG. 5 shows a partial view in the direction of Arrow B in FIG. 4.
Figure 8:
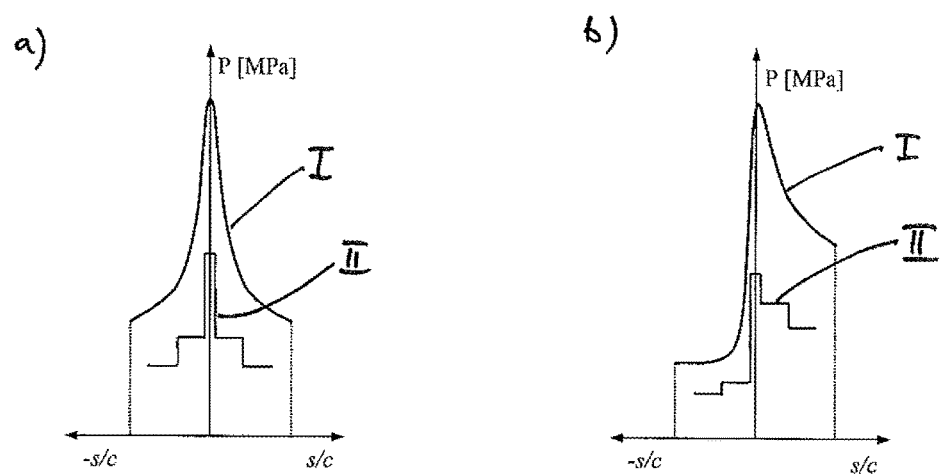
FIG. 8 shows graphs of the pressure distribution along the outer surface of the nose member and inside the channels of the embodiment of FIGS. 3 and 4 for different flight conditions.

To adjust the pressure in the air channel 9, the enforcement elements 30 comprises orifices 31 (FIG. 5). Therefore, the pressure drop from the perforated nose member 25 provides for the needed suction distribution along the nose member 25. In particular, FIG. 8 shows graphs of the resulting pressure distribution along the outer surface of the nose member 25 (Curves I) and inside the different channels 32 (Curves II) for different flight conditions wherein the abscissa of the graphs indicates the distance from the tip end of the nose member 25 in a plane perpendicular to the longitudinal direction of the nose member 25. In Graph a) the distribution for a flight in line is shown whereas Graph b) shows the distribution for a jaw flight.

As can be seen, the pressure distribution I on the outer surface of the nose member 25 has a peak at the tip end and strongly decreases with increasing distance from the tip end. Further, as indicated by curves II in the centered channel 32 the highest pressure occurs whereas the laterally arranged channels 32 show a significantly lower pressure.

Theses distributions and especially the pressure drop along the outer surface of the nose member 25 can be adjusted for a given nose member 25 by properly choosing the number and the dimensions of the orifices 31.

Figure 4:
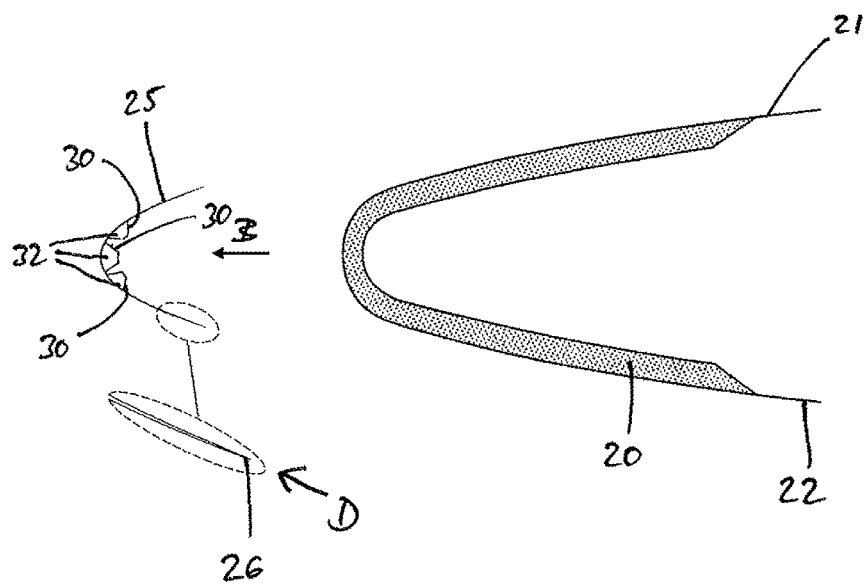
FIG. 4 shows the elements of FIG. 3 before assembling.
Figure 6:
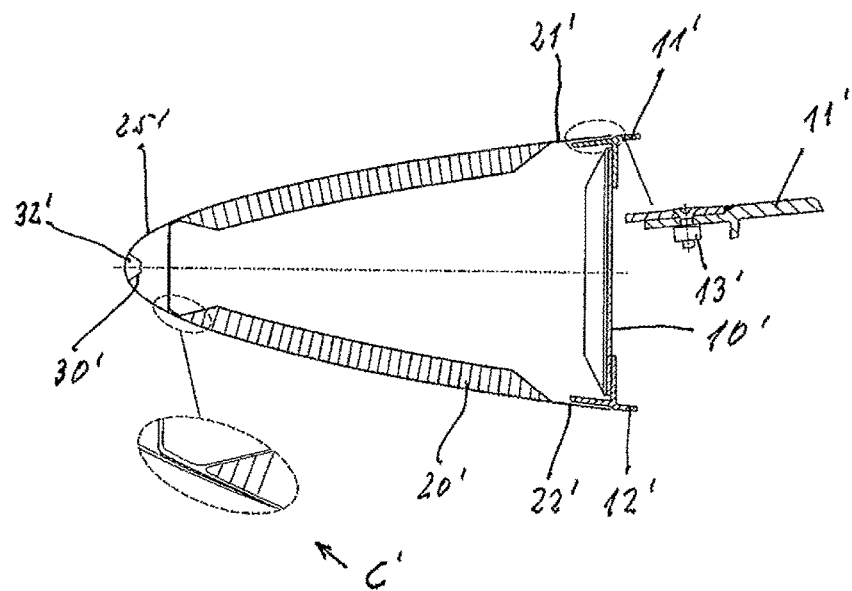
FIG. 6 shows in a view corresponding to FIG. 4 another embodiment of the invention.
Figure 7:
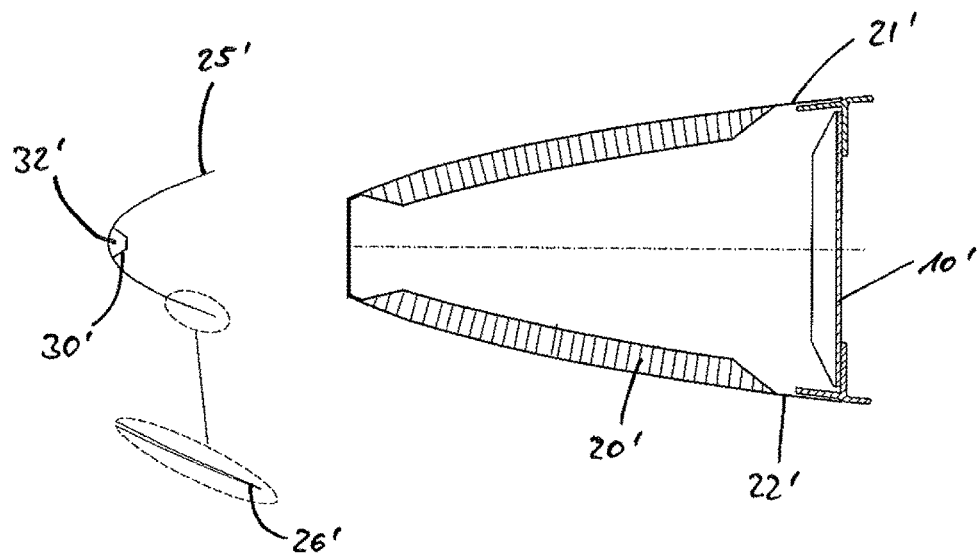
FIG. 7 shows the elements of FIG. 7 before assembling.

In the embodiment of FIGS. 6 and 7 the elements corresponding to those of FIGS. 3 to 5 are designated with the same reference numerals plus a single quote mark ('). Elements identical with those of FIGS. 3 to 5 will not be described again.

The shape of the one-piece nose element 20' is slightly different in that its closed front end is formed by a relatively thin wall which is not curved but straight. It is formed by a GFRP sandwich with a honeycomb core.

The nose member 25' is to be fixed by means of an adhesive bonding on the outer surfaces of the nose element 20' as indicated in FIG. 7. Further, the nose member 25' is provided with a sole enforcement element 30' only so that it comprises a single vertical channel 32'.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An aircraft comprising:
   a fuselage,
   wings,
   horizontal stabilizers,
   a vertical stabilizer,
   an elongated one-piece closed nose element mounted on a front portion of said vertical stabilizer forming lateral air guide surfaces, the lateral air guide surfaces corresponding to exterior surfaces of the elongated one-piece closed nose element in contact with an ambient air flow and located downstream from a front end of the elongated one-piece closed nose element nose element, and
   a perforated metal plate nose member attached to a front end of the elongated one-piece closed nose element wherein the front end of the nose element corresponds to a leading edge of the elongated one-piece closed nose element,
   the front end of said elongated one-piece closed nose element being closed and between the closed front end and the nose member, an elongated air channel is formed, wherein the elongated one-piece closed nose element is formed as a separate part that is mounted to a front spar of the vertical stabilizer and extends exclusively in front of the front spar.

2. The aircraft according to claim 1, wherein said air channel extends to the upper end of the vertical stabilizer and is open at the upper end of the air channel.

3. The aircraft according to claim 2, wherein the cross-section of said air channel decreases from the lower end of the air channel to the upper end of the air channel.

4. The aircraft according to claim 1, wherein said air channel is connected to a suction pump.

5. The aircraft according to claim 1, wherein at the front end of the nose member an elongated enforcement element is attached to an inner surface of the nose member, the enforcement element comprising a plurality of openings.

6. The aircraft according to claim 5, wherein said enforcement element is arranged symmetrically with respect to a vertical plane through the longitudinal axis of the fuselage and is formed in cross-section so that at least one vertical channel is formed between said enforcement element and the inner surface of said nose member.

7. The aircraft according to claim 1, wherein said nose member comprises titanium or a titanium alloy.

8. An aircraft comprising:
a fuselage,
wings,
horizontal stabilizers,
a vertical stabilizer,
an elongated one-piece closed nose element mounted on a front portion of the vertical stabilizer having an exterior surface in contact with an ambient air flow, and
a perforated metal plate attached to a leading edge of the elongated one-piece closed nose element,
an elongated air channel located at the leading edge of the elongated one-piece closed nose element and formed between the exterior surface of the elongated one-piece closed nose element and the perforated metal plate attached to the leading edge of the elongated one-piece closed nose element,
wherein the elongated one-piece closed nose element is formed as a separate part that is mounted to a front spar of the vertical stabilizer and extends in exclusively front of the front spar.

* * * * *